United States Patent
Mestre et al.

(10) Patent No.: US 11,120,441 B2
(45) Date of Patent: Sep. 14, 2021

(54) APPARATUS, METHOD, AND COMPUTER PROGRAM PRODUCT FOR PROVIDING A QUALITY CONTROL MECHANISM FOR THE CONTACTLESS INTERFACE OF A DUAL-INTERFACE CARD

(71) Applicant: MasterCard International Incorporated, Purchase, NY (US)

(72) Inventors: Patrick Mestre, Namur (BE); Cristian Radu, Beauvechain (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1806 days.

(21) Appl. No.: 14/076,193

(22) Filed: Nov. 9, 2013

(65) Prior Publication Data

US 2014/0067685 A1 Mar. 6, 2014

Related U.S. Application Data

(62) Division of application No. 12/769,395, filed on Apr. 28, 2010, now Pat. No. 8,583,561.
(Continued)

(51) Int. Cl.
*G06Q 20/40* (2012.01)
*G06Q 20/34* (2012.01)
(Continued)

(52) U.S. Cl.
CPC ....... *G06Q 20/40* (2013.01); *G06K 19/07749* (2013.01); *G06K 19/07769* (2013.01);
(Continued)

(58) Field of Classification Search
CPC ........ G06Q 20/40; G06Q 20/10; G06Q 20/32; G06Q 20/327; G06Q 20/341;
(Continued)

(56) References Cited

U.S. PATENT DOCUMENTS 6,092,202 A * 7/2000 Veil .......................... G06F 21/34
705/64
6,101,477 A 8/2000 Hohle
(Continued)

FOREIGN PATENT DOCUMENTS

EP 1050027 8/2000
WO 1999-038129 7/1999
(Continued)

OTHER PUBLICATIONS

"An Exploration on Security and Privacy Issues of Biometric Smart IC Cards"; by Qinghan Xiao, Senior Member, IEEE, and Mario Savastano; 2007; file 'An Exploration on Security and Privacy Issues of Biometric Smart IC Cards.pdf' (Year: 2007).*
(Continued)

*Primary Examiner* — James D Nigh
*Assistant Examiner* — Edgar R Martinez-Hernandez
(74) *Attorney, Agent, or Firm* — Otterstedt, Wallace & Kammer, LLP

(57) ABSTRACT

Techniques for enabling performance of a quality control function on the contactless interface while the contactless interface is disabled are provided. The techniques include implementing, on a dual-interface payment device, one or more security mechanisms, wherein the dual-interface payment device comprises a first interface and a second interface, using the one or more security mechanisms to prevent a subset of data corresponding to the first interface from being read using the second interface while allowing data corresponding to the second interface to be read using the first interface, and personalizing the dual-interface payment device and the one or more security mechanisms according to one or more requirements of an issuer of the dual-interface payment device.

8 Claims, 17 Drawing Sheets

NEW EMV CARD APPLICATION BEHAVIOUR WITH CONTACTLESS INTERFACE DISABLED

Related U.S. Application Data

(60) Provisional application No. 61/173,471, filed on Apr. 28, 2009, provisional application No. 61/258,759, filed on Nov. 6, 2009.

(51) Int. Cl.

| | | |
|---|---|---|
| *G06Q 20/32* | (2012.01) | |
| *G06Q 20/22* | (2012.01) | |
| *G06Q 20/10* | (2012.01) | |
| *G06K 19/077* | (2006.01) | |
| *G07F 7/08* | (2006.01) | |

(52) U.S. Cl.
CPC ......... *G06Q 20/10* (2013.01); *G06Q 20/2295* (2020.05); *G06Q 20/32* (2013.01); *G06Q 20/327* (2013.01); *G06Q 20/341* (2013.01); *G06Q 20/352* (2013.01); *G06Q 20/357* (2013.01); *G06Q 20/35765* (2013.01); *G07F 7/0873* (2013.01)

(58) Field of Classification Search
CPC ............... G06Q 20/352; G06Q 20/357; G06Q 20/35765; G06Q 20/35785; G06Q 20/2295; G06K 19/07749; G06K 19/07769; G07F 7/0873
USPC .......................................................... 705/64
See application file for complete search history.

(56) References Cited

U.S. PATENT DOCUMENTS

| | | | | |
|---|---|---|---|---|
| 6,119,945 | A | 9/2000 | Muller | |
| 6,375,084 | B1 | 4/2002 | Stanford | |
| 6,398,110 | B1 | 6/2002 | Kikuchi | |
| 6,402,038 | B1 | 6/2002 | Stanford | |
| 7,103,575 | B1* | 9/2006 | Linehan | G06Q 20/12 235/379 |
| 7,225,465 | B2 | 5/2007 | Audebert | H04L 63/0853 380/282 |
| 7,246,750 | B2 | 7/2007 | Cho | |
| 7,287,695 | B2* | 10/2007 | Wankmueller | G06K 19/10 235/383 |
| 7,309,007 | B2 | 12/2007 | Kean | |
| 7,374,082 | B2* | 5/2008 | Van de Velde | G06Q 20/045 235/380 |
| 7,438,236 | B2 | 10/2008 | Top | |
| 7,584,153 | B2* | 9/2009 | Brown | G07F 7/1083 235/380 |
| 7,657,486 | B2 | 2/2010 | Smets | |
| 7,865,430 | B1* | 1/2011 | Kolls | G06Q 20/10 705/39 |
| 8,108,307 | B1* | 1/2012 | Kawan | G06Q 20/3572 705/41 |
| 8,109,444 | B2 | 2/2012 | Jain | |
| 8,176,335 | B2* | 5/2012 | Holtzman | G06F 8/65 710/301 |
| 8,320,962 | B2* | 11/2012 | Wilson | G07F 7/10 455/557 |
| 2001/0018660 | A1 | 8/2001 | Sehr | |
| 2001/0027441 | A1 | 10/2001 | Wankmueller | |
| 2002/0147907 | A1 | 10/2002 | Ross | |
| 2003/0097344 | A1 | 5/2003 | Chaum | |
| 2003/0236748 | A1 | 12/2003 | Gressel | |
| 2004/0069853 | A1* | 4/2004 | Aharonson | G06K 19/0728 235/454 |
| 2004/0164142 | A1 | 8/2004 | Flugge | |
| 2004/0230535 | A1 | 11/2004 | Binder et al. | |
| 2004/0238624 | A1 | 12/2004 | Nakano | |
| 2005/0033688 | A1 | 2/2005 | Peart | |
| 2006/0032927 | A1* | 2/2006 | Kargl | G06K 19/0723 235/492 |
| 2006/0049258 | A1 | 3/2006 | Piikivi | |
| 2006/0129948 | A1* | 6/2006 | Hamzy | G06F 21/84 715/790 |
| 2006/0283960 | A1* | 12/2006 | Top | G06K 19/07309 235/492 |
| 2006/0287964 | A1* | 12/2006 | Brown | G07F 7/08 705/64 |
| 2007/0012763 | A1 | 1/2007 | Van de Velde | |
| 2007/0095924 | A1* | 5/2007 | Degauque | G06Q 20/3563 235/492 |
| 2007/0168260 | A1 | 7/2007 | Cunescu | |
| 2007/0215697 | A1 | 9/2007 | Ward | |
| 2007/0225038 | A1* | 9/2007 | Takeda | G06K 19/07 455/558 |
| 2008/0035738 | A1* | 2/2008 | Mullen | G06Q 20/04 235/492 |
| 2008/0082452 | A1 | 4/2008 | Wankmueller | |
| 2008/0126398 | A1* | 5/2008 | Cimino | G06Q 20/341 |
| 2008/0128513 | A1* | 6/2008 | Hammad | G06Q 20/12 235/492 |
| 2008/0179403 | A1 | 7/2008 | Englebardt | |
| 2008/0251580 | A1 | 10/2008 | Van de Velde | |
| 2008/0301056 | A1* | 12/2008 | Weller | G06Q 20/02 705/67 |
| 2009/0039149 | A1* | 2/2009 | Top | G06K 19/07345 235/375 |
| 2009/0041626 | A1* | 2/2009 | Atkin | B01L 3/502715 422/68.1 |
| 2009/0065325 | A1* | 3/2009 | Potonniee | G06K 19/07716 194/210 |
| 2009/0070272 | A1* | 3/2009 | Jain | G06K 7/10237 705/75 |
| 2009/0103730 | A1 | 4/2009 | Ward | |
| 2010/0163614 | A1* | 7/2010 | Yang | G06K 7/0013 235/375 |
| 2010/0274722 | A1 | 10/2010 | Roberts | |
| 2010/0311466 | A1* | 12/2010 | Wilson | G06K 19/07336 455/557 |
| 2010/0325039 | A1 | 12/2010 | Radu | |
| 2012/0011062 | A1 | 1/2012 | Baker | |
| 2012/0011070 | A1 | 1/2012 | Ward | |

FOREIGN PATENT DOCUMENTS

| | | | | |
|---|---|---|---|---|
| WO | WO 02/054195 | * 12/2001 | ............... | G06F 1/00 |
| WO | 2002-054195 | 7/2002 | | |
| WO | 2007-030480 | 3/2007 | | |
| WO | 2012-037971 | 3/2012 | | |

OTHER PUBLICATIONS

"Design and Evaluation of High Security Contact-Contactless Smart IC Cards"; by Koji Tsuru, Koushi Murata, Yoshimitsu Ohtani, and Yasuhiro Nagai; file 'Design and Evaluation of High Security Contact-Contactless Smart IC Cards.pdf' (Year: 2001).*
"NFC Devices—Security and Privacy"; by Gerald Madlmayr, Josef Langer; Christian Kantner, Josef Scharinger; file 'NFC Devices—Security and Privacy.pdf' (Year: 2008).*
"EMV" downloaded from http://en.wikipedia.org/wiki/EMV on Sep. 22, 2010.
"ISO 8583" downloaded from http://en.wikipedia.org/wiki/IS0_8583 on Sep. 22, 2010.
"Mobile payment" downloaded from http://en.wikipedia.org/wiki/Mobile_payment#Online_Wallets on Sep. 22, 2010.
EMV Integrated Circuit Card Specifications for Payment Systems Book 1 Application Independent ICC to Terminal Interface Requirements Version 4.2 Jun. 2008.
EMV Integrated Circuit Card Specifications for Payment Systems Book 2 Security and Key Management Version 4.2 Jun. 2008.
EMV Integrated Circuit Card Specifications for Payment Systems Book 3 Application Specification Version 4.2 Jun. 2008.
EMV Integrated Circuit Card Specifications for Payment Systems Book 4 Cardholder, Attendant, and Acquirer Interface Requirements Version 4.2 Jun. 2008.
EMV Integrated Circuit Card Specifications for Payment Systems—Common Payment Application Specification, Version 1.0, Dec. 2005, pp. i-xx & L-33 to L-34.

(56) References Cited

OTHER PUBLICATIONS

Corrections to Common Core Definitions, Specification Update Bulletin No. 41, 3rd Edition Nov. 2007, EMVCo.
Support for Transaction Log Files, Specification Update Bulletin N° 19 Second Edition, May 2004, EMVCo.
ISO/IEC9797-1 Information technology-Security techniques-Message Authentication Codes (MACs)—Part 1, downloaded from http://en.wikipedia.org/wiki/ISO/IEC_9797-1 on Mar. 22, 2012.
"Message authentication code" downloaded from http://en.wikipedia.org/wiki/Message_authentication_code.
"Chipo Terms Explained: A Guide to Smart Card Terminology." downloaded from http://www.visa-asia.com/ap/center/merchants/productstech/includes/uploads/CTENov02.pdf.
Bank Zachodni WBK "Top-Up Card" downloaded from http://english.bzwbk.pl/28600.
Bank Zachodni WBK "Premium Top-Up Card" downloaded from http:/ leng lish. bzwbk. pl/34595.
Bank Zachodni Wbk "Pre-Paid Cards" downloaded from http://english.bzwbk.pl/38134.
"Near Field Communication." downloaded from http://en.wikipedia.org/wiki/Near_Field_Communication.
EP Search Report for 10770267.2-1955 / 2430601 PCT/US2010032778, dated May 10, 2016.

* cited by examiner

*FIG. 1*
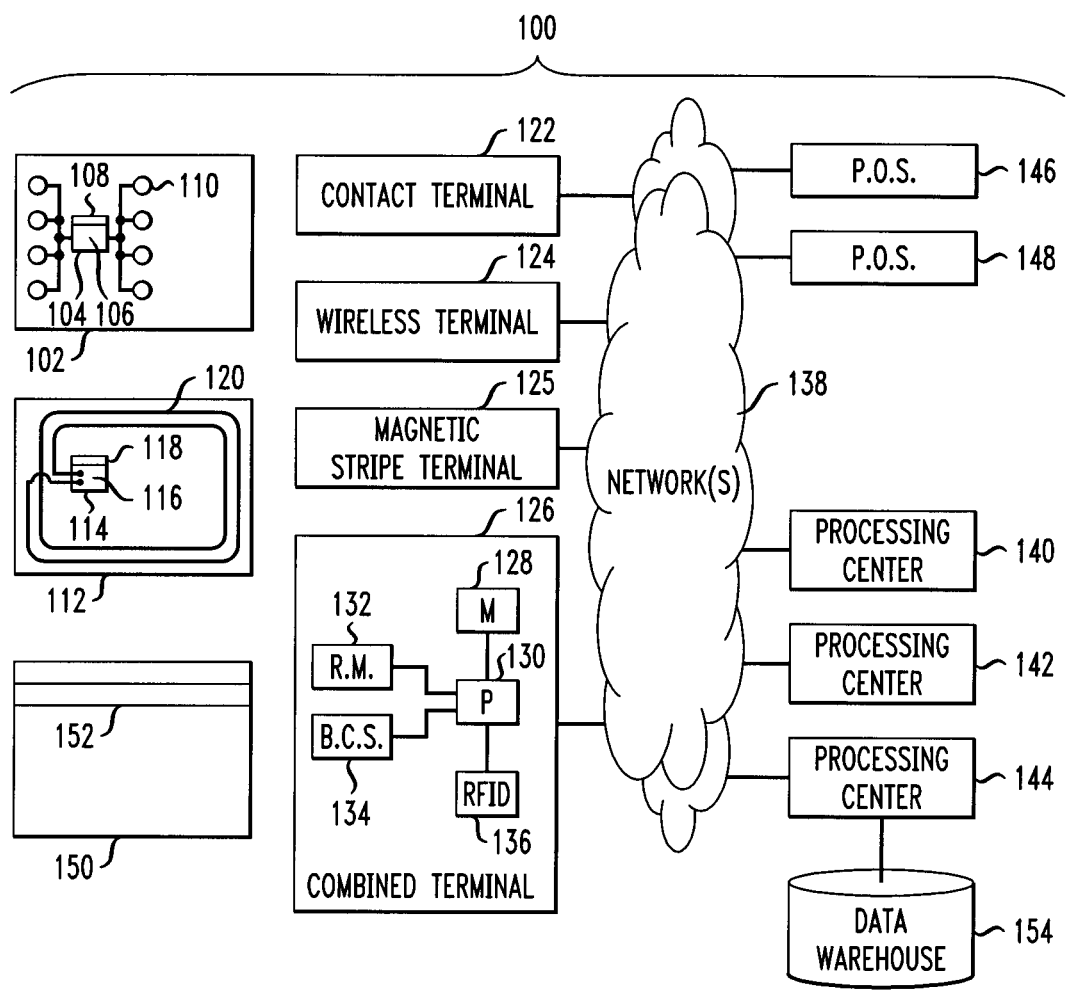
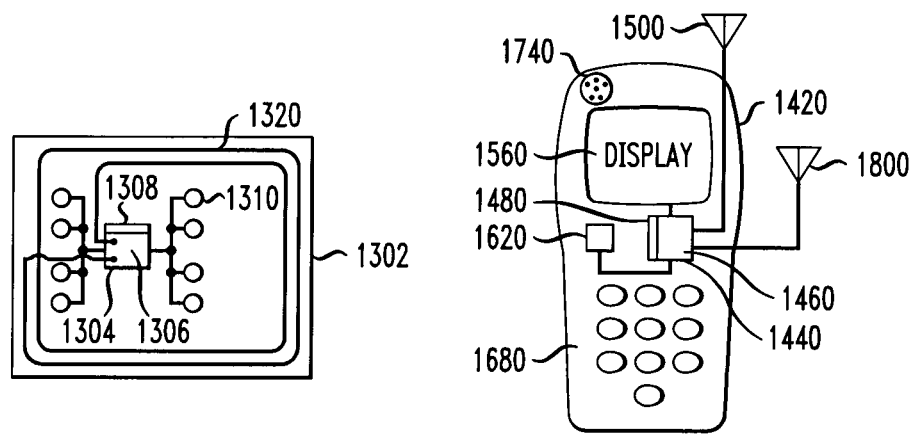

NEW EMV CARD APPLICATION BEHAVIOUR

APPARATUS, METHOD, AND COMPUTER PROGRAM PRODUCT FOR PROVIDING A QUALITY CONTROL MECHANISM FOR THE CONTACTLESS INTERFACE OF A DUAL-INTERFACE CARD

CROSS-REFERENCE TO RELATED APPLICATIONS

This patent application is a divisional of U.S. patent application Ser. No. 12/769,395, filed Apr. 28, 2010, entitled Apparatus, Method, and Computer Program Product for Providing a Quality Control Mechanism for the Contactless Interface of a Dual-Interface Card, which in turn claims the benefit of U.S. Provisional Patent Application Ser. No. 61/173,471 filed on Apr. 28, 2009 and entitled "M/Chip 4 Release 2 (Payment Card Application) (A&B)" and U.S. Provisional Patent Application Ser. No. 61/258,759 filed on Nov. 6, 2009 and entitled "Transaction Processing in Payment-Enabled Mobile Telephone." The complete disclosures of the aforementioned patent application Ser. No. 12/769, 395, Provisional Patent Application Ser. No. 61/173,471, and Provisional Patent Application Ser. No. 61/258,759 are expressly incorporated herein by reference in their entireties for all purposes.

FIELD OF THE INVENTION

The present invention relates generally to the electronic and computer arts, and, more particularly, to apparatus and methods for electronic payment.

BACKGROUND OF THE INVENTION

Devices, such as electronic devices, and particularly electronic payment devices (for example, so-called "smart cards," payment chip cards, etc.) may be useful for a variety of payment and other applications. Initially, payment chip cards had just one interface, a contact interface that was used when a card was physically inserted into a reader to facilitate a payment transaction. Subsequently, a second interface to the chip has been developed, with such an interface generally including a contactless card interface that interfaces with a payment reader using radio frequency (RF) communications to perform a transaction. As such, in a standard dual interface card, routes to communicating to the card include a contact interface and a contactless interface.

Typically, such a smart card application has two sets of data: one set of data that is used when using the contact interface, and one set of data that is used when using the contactless interface. There is typically a security concern that some data that is used via the contact interface (for example, the cardholder's name) should never be available via the contactless interface and hence only exist in the set of data that is used via the contact interface. This leads to the two sets of data being different. However, with respect to the contactless interface, another security concern can exist in shipping a card, after it has been produced, through the mail to the cardholder, in that it is potentially possible to read the data that is required for a payment transaction through the envelope of the card.

Existing approaches attempting to remedy this concern include physically disabling the contactless interface, with a button or the like, on the card to prevent the contactless interface from being used until the time is appropriate. Many such approaches rely on a form of shielding in the card envelope, or a physical switch or button, but such mechanisms can be expensive.

Thus, after the production and personalization of a card, its contactless interface may be disabled. When sent through mail, data cannot be read from the card over the contactless interface. It is also typical that after card production, a random sample of the cards produced may be inspected to ensure the quality of the production process.

SUMMARY OF THE INVENTION

Principles of the invention provide techniques for providing a quality control mechanism for the contactless interface of a dual-interface card. The techniques include the steps of implementing, on a dual-interface payment device, one or more security mechanisms, wherein the dual-interface payment device comprises a first interface and a second interface, using the one or more security mechanisms to prevent a subset of data corresponding to the first interface from being read using the second interface while allowing data corresponding to the second interface to be read using the first interface, and personalizing the dual-interface payment device and the one or more security mechanisms according to one or more requirements of an issuer of the dual-interface payment device.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention can provide substantial beneficial technical effects; for example:
 enabling the performance of a quality control function on a dual-interface card while keeping the contactless interface disabled;
 allowing restrictions to be placed on the data that can be read using each interface while the card is in use by the cardholder;
 allowing these restrictions to be defined by the card issuer at production and changed by the issuer during the card's life in the field; and enabling quality control or testing of a card to be performed using a single interface, rather than requiring the use of both of two interfaces (even if both were available), which can provide time and cost saving.

These and other features and advantages of the present invention will become apparent from the following detailed description of illustrative embodiments thereof, which is to be read in connection with the accompanying drawings.

BRIEF DESCRIPTION OF THE DRAWINGS

FIG. 1 shows an example of a system and various components thereof that can implement techniques of the invention;

DETAILED DESCRIPTION OF PREFERRED EMBODIMENTS

Figure 2:
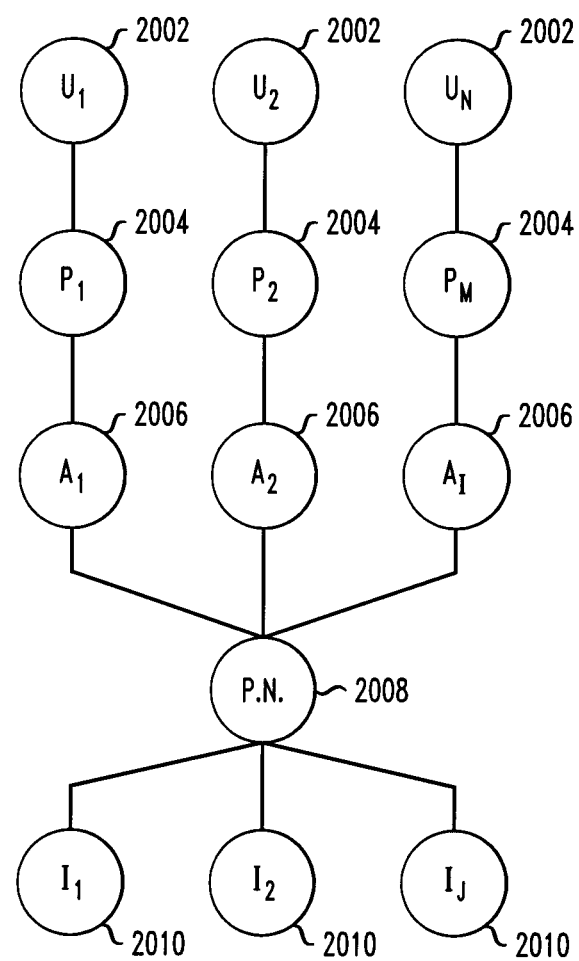
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

Attention should now be given to FIG. 1, which depicts an exemplary embodiment of a system 100, according to an aspect of the invention, and including various possible components of the system. As described herein, one or more embodiments of the invention are particularly applicable to dual-interface card devices. A number of additional devices and components (including, for example, single interface cards, mobile telephones, etc.) are nonetheless contemplated and described herein for completeness.

System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system per se may function with other types of devices in lieu of or in addition to "smart" or "chip" cards 102, 112; for example, a conventional card 150 having a magnetic stripe 152. Furthermore, an appropriately configured cellular telephone handset, personal digital assistant (PDA), and the like can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal for processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory (for example, one or more electrically erasable programmable read-only memories (EEPROMs) as discussed below). The memory units can store transaction card data such as, for example, a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by MAOSCO Limited. (MAOSCO Limited, St. Andrews House, The Links, Kelvin Close, Birchwood, Warrington, WA3 7PB, United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

It should be noted that the skilled artisan will be familiar with the EMV specifications. Nevertheless, out of an abundance of caution, the following documents are expressly incorporated herein by reference in their entirety for all purposes (the same are published by EMVCo and available on EMVCo's web site):

- EMV Integrated Circuit Card Specifications for Payment Systems Book 1 Application Independent ICC to Terminal Interface Requirements Version 4.2 June 2008
- EMV Integrated Circuit Card Specifications for Payment Systems Book 2 Security and Key Management Version 4.2 June 2008
- EMV Integrated Circuit Card Specifications for Payment Systems Book 3 Application Specification Version 4.2 June 2008
- EMV Integrated Circuit Card Specifications for Payment Systems Book 4 Cardholder, Attendant, and Acquirer Interface Requirements Version 4.2 June 2008
- *EMV Integrated Circuit Card Specifications for Payment Systems—Common Payment Application Specification*, Version 1.0, December 2005
- Corrections to Common Core Definitions, Specification Update Bulletin No. 41, First Edition June 2005, EMVCo
- *Support for Transaction Log Files*, Specification Update Bulletin N°19 Second Edition, May 2004, EMVCo.

As noted, cards 102, 112 are examples of a variety of payment devices that can be employed. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. In some cases, the cards, or other payment devices, can include body portions (for example, laminated plastic layers of a payment card, case or cabinet of a PDA or cellular phone, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards for example, contacted, magnetic stripe, or contactless). Terminals 122, 124, 125, 126 can be connected to one or more processing centers 140, 142, 144 via a computer network 138. Network 138 could include, for example, the Internet, or a proprietary network (for example, a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a universal product code (UPC) code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

In one or more versions of the infrastructure, a dual-interface device 1302 is employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112.

An appropriately configured cellular telephone handset 1420 can also be employed in infrastructure 100. Handset 1420 is depicted in semi-schematic form in FIG. 1, and can include one or more IC chips such as chip 1440 including a processing unit 1460 and a memory unit 1480. Wireless communication with a terminal can be provided via antenna 1500 or with a second antenna 1800 similar to above-described antenna 120 (that is, the handset could have a second antenna for the payment application). Note that antenna 1800 is depicted schematically, but could be, for example, a coil antenna as used in a typical "smart" card. Handsets 1420 can each be equipped with a suitable display 1560. Further, an appropriate power supply 1620 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1. Keypad 1680 and speaker 1740 can be provided.

The description of devices, elements, or components 102, 104, 106, 108, 110, 112, 114, 116, 118, 120 throughout this document are equally applicable to the corresponding items in the dual interface card 1302 and cellular telephone handset 1420.

With reference to FIG. 2, an exemplary relationship among multiple entities is depicted. A number of different users (for example, consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed with other kinds of payment networks.

Messages within a network such as network 138 and/or network 2008, may, in at least some instances, conform to the International Organization for Standardization (ISO) Standard 8583, *Financial transaction card originated messages—Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003).

As noted above, in a standard dual-interface card, routes to communicating to the card include a contact interface and a contactless interface. The information that is involved in a transaction for payment may be different depending on the interface that is being used. There may be data that is associated with and designed for being used in a contact environment that has the ability to, for example, enter a personal identification number (PIN) and perform higher value transactions, that is not relevant to or the same as information that is appropriate when using the contactless interface.

To implement a requirement of identical behavior of the card application regardless of the interface that initiated the transaction, one or more embodiments of the invention can be designed as a multiple interface software code. A multiple interface software code has a different execution behavior when different interfaces are activated. The difference in behavior is based not on the code that is running (that is, there is not different code for different interfaces), but on the persistent data that is used when the interface is activated. Each interface uses different values of some of the persistent data elements, which can be referred to as interface-specific data. This leads to different execution behaviors of the same software code. Thus, the persistent data becomes a parameter of the software execution.

Figure 3:
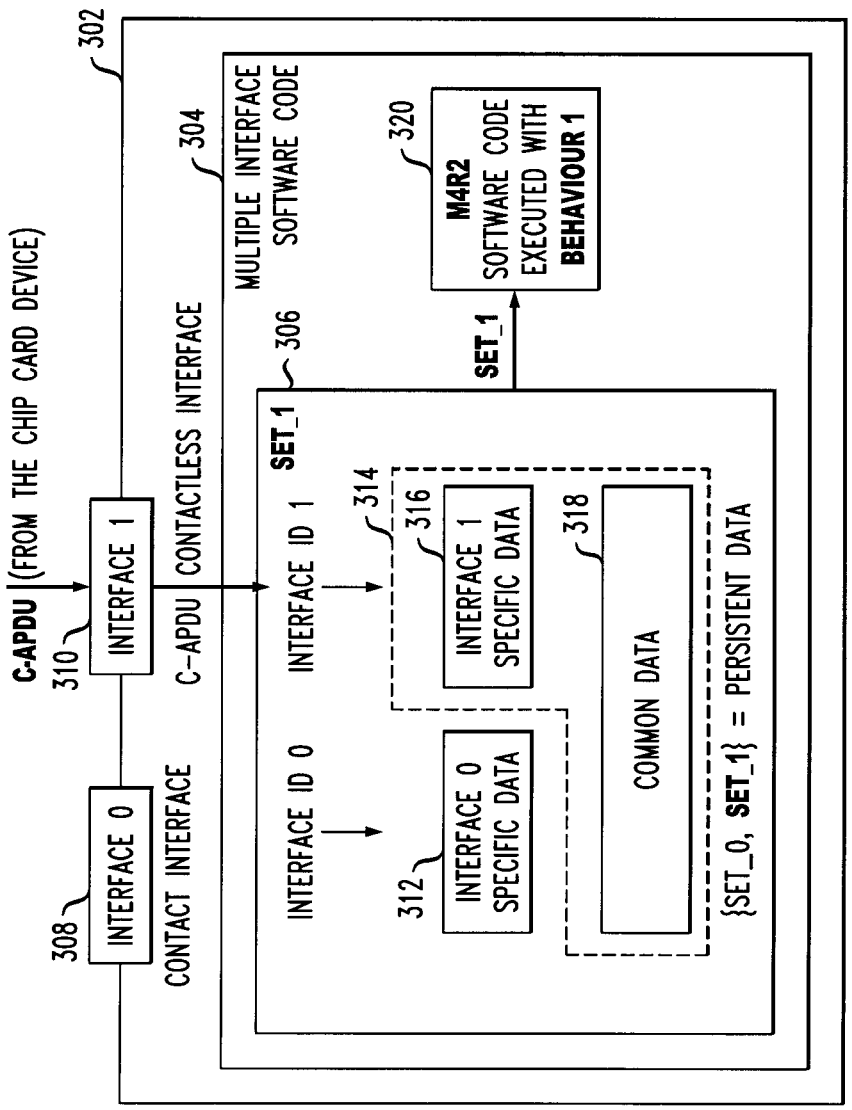
FIG. 3 depicts parameterization of software code through the data set of the activated interface, according to aspects of the invention.

This concept is presented in FIG. 3, which depicts parameterization of software code through the data set of the activated interface, according to aspects of the invention. By way of illustration, FIG. 3 depicts a dual interface payment device 302, which includes contact interface 308 and contactless interface 310 (which receives a command-application protocol data unit (C-APDU) from a chip card device). FIG. 3 also depicts multiple interface software code 304, which includes component 306 which constitutes the complete set of data held by the payment application, which includes a contact interface specific data component 312 and a contactless interface specific data component 316 and a common data component 318. In the example depicted in FIG. 3, wherein the contactless interface is in use, the data set 314 is processed by the application software code component 320 (by way of example and not limitation, M4R2).

When the interface i, with i=0 or i=1, is activated, then the set i of the persistent data, which includes the common data and the interface i specific data, is used. It can be said that, in one or more embodiments of the invention, execution is parameterized through the Set_i of data specific to an interface.

In at least some such embodiments, the card's operating system will not permit the interface to be changed during a transaction without resetting the session. The card's operating system sends the select signal and any of the card commands (for example, command-application protocol data unit (C-APDU)) to the software code. Along with this data, the application must be able to determine the interface used for the C-APDU in order to select the appropriate interface specific data set. Therefore, when testing a card during production, it is not possible to read data from an interface specific data set via another interface, and reading data via each interface, in turn, would be expensive in time and equipment and impossible if one of the interfaces has been disabled until received by the cardholder.

Figure 16:
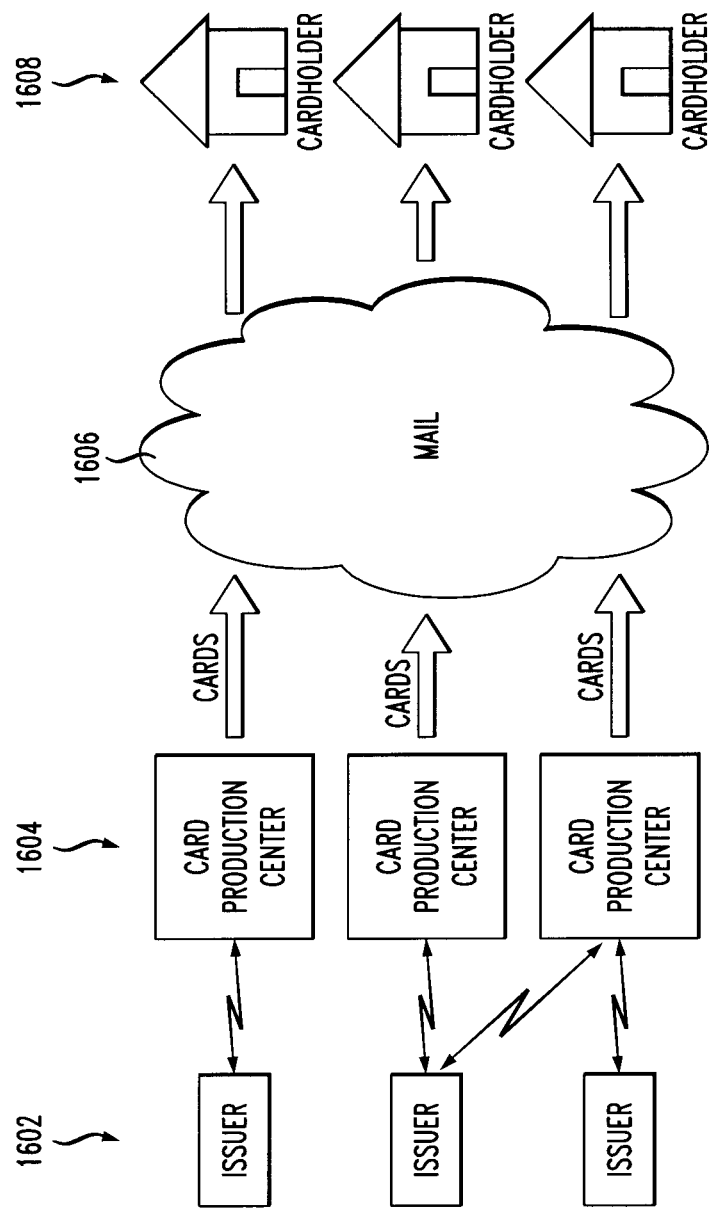
FIG. 16 is a diagram illustrating plurality of issuers connected to a plurality of card production centers sending cards via the mail to a plurality of cardholder homes.

As detailed herein, one or more embodiments described herein remedy the above-noted quality control concern when cards are produced (see, also, FIG. 16). By way of example and not limitation, in a card production center or bureau, the processor would personalize all appropriate data into each card, the data for both the contact interface and the contactless interface. This could also include, for instance, setting the feature that disables the contactless interface until after the contact interface has been used for a transaction. At this point, at the final stage of production, there is a requirement for the bureau to perform a quality control function, for example, in terms of randomly sampling cards and verifying that they have been personalized correctly. This becomes a significant challenge if access to that data has been switched off by way of a security feature for protecting the card in the mail or until activated by the cardholder. As detailed herein, one or more embodiments of the invention overcome such noted security challenges with respect to quality assurance and advantageously enable card issuers and card processors to check whether data has been personalized properly prior to the issuance of the card.

As such, one or more embodiments of the invention include providing a mechanism that enables performance of a quality control function while upholding the desire to keep the contactless interface disabled. One or more embodiments of the invention, rather than denying access to read data from one interface in terms of being able to read the contactless information from the contact interface as would typically be done, instead incorporate an ability whereby personalized into the card is a specific read record filter (that is, a set of instructions to the card) that instruct the card what data cannot be read when using a particular interface.

One concern in terms of data protection is that when using a contactless interface, one cannot, for example, read what the cardholder's name is that is personalized onto the card for use when they are performing a contact transaction. Normally, it is undesirable for such information to be available via the contactless interface. However, there can often be less of a need for restrictions, in terms of security concerns, why data could not be accessible via the contact interface.

As such, rather than specifically identifying a set of data that is exclusively for the contact interface and a set of data that is exclusively for the contactless interface, the techniques detailed herein enable one to define a set of data that cannot be used on a particular interface, while still facilitating data to be read from the other interface. Therefore, one or more embodiments of the invention enable personalization of a card so that its contactless interface is fully disabled during shipping of the card through the mail, while also providing instructions necessary to instruct the card that when using the contactless interface in the lifecycle of the card, certain data records cannot be read from the card (such as, for example, the record that contains the cardholder name).

Consequently, one or more embodiments of the invention allow for contactless data to be read when using the contact interface, so that via use of the contact interface one can verify that the data for the contactless interface was correctly personalized (that is, the set of data that will be used for contactless interface transactions is correct and accurate).

In one or more embodiments of the invention, there are two sets of data (one for the contact interface and one for the contactless interface) that are, in many cases, almost duplicates of one another, and the appropriate set of data to return to a terminal is defined in a data item that is referred to herein as the application file locator (AFL), as defined in the EMV specifications. The AFL instructs a terminal what data to read for a particular transaction. For example, when a transaction is performed on the contact interface, an AFL will be returned that specifies the records containing the data to use in performing that transaction. Similarly, an AFL with different values indicating the records containing the data that is appropriate to use on the contactless interface is returned when a transaction is performed on the contactless interface. And further, under normal circumstances, the terminal would only read or be able to read that some or all (for example, as specified) data during that transaction.

The AFL that is returned by the card instructs the terminal which of the records to read during the course of a transaction, and where the records, for which the data is required to perform the transaction, can be found. Each of those records can contain one or more different data items such as the cardholder name, account number, etc. Thus, one can devise which piece of data to put in which record, as well as define the AFL, which indicates the appropriate records to use for each interface. One or more embodiments of the invention, however, can include read record filters that can, rather than letting the AFL determine what records can be read, define on a per interface basis what records cannot be read and are to be withheld by the card.

By way of illustration, in a typical application, there would be one record on the card that contained a sensitive data item (such as, for example, the cardholder name) and would be used during a contact transaction. That might, merely by way of illustration, be stored in file #3, record #2. As such, the read record filter on the contact interface could include a blank list. That is, there would be nothing restricted in terms of what could be read using the contact interface. The read record filter for the contactless interface would include the identity of that record, file #3, record #2, to indicate that particular record can never be read using the contactless interface.

As noted, one or more embodiments of the invention enable the specification, on an interface basis, of certain data as not accessible. As such, a card can be configured such that it can be personalized at a bureau with a set of data for each interface, with the contactless interface disabled temporarily while it is shipped in the mail, while still enabling the bureau, using the contact interface, to read all of the data for quality control purposes.

As such, one or more embodiments of the invention include implementing a read record filter for each interface that limits the data that can be read over this interface. Each read record filter can be, for example, coded similar to an AFL, that is, as a combination of short file identifiers (SFIs) and record numbers. An SFI is a data element used to uniquely identify a file of records and a record number is a data element used to uniquely identify an individual record within a file. The list of SFIs and the record numbers that make up each read record filter specify which records cannot be read through a read record command.

Two separate read record filters can be used, one per each interface. In one or more embodiments of the invention, the contact read record filter can be personalized, for example, to any value required by the issuer, and can also be formatted to "pass everything" to allow the reading of the contact as well as the contactless data through the contact interface. This allows for the checking of personalization of the contactless data (that is, performing a quality control function), even if the contactless interface is disabled.

The contactless read record filter can, for example, contain the SFI and the record number containing the cardholder name. In other words, that data could only be read over the contact interface. By including this data element in the read record filter, it cannot be read over the contactless interface. As such, the techniques described herein enable issuers and personalization bureaus to ensure quality control of the personalization of the contactless interface without having to enable the contactless interface (and hence change the state of the card).

By way of example and not limitation, to allow some contactless data to be read over the contact interface (while the contactless interface is disabled), the GET DATA command as defined in the EMV specifications can be provided on the contract interface to enable reading of both the contact and contactless AFL. Further, the READ RECORD command as defined in the EMV specifications can be provided on the contact interface to enable reading of all of the files and records that are not listed in the read record filter. An attempt to read a combination (file, record) that is listed in the filter would, for example, result in an error. When the contact instance of the read record filter is empty, then the contact READ RECORD can read all of the records included in the contact and contactless AFL.

In one or more embodiments of the invention, the read record filters can remain in effect on the card in perpetuity. The read record filters explicitly disable the access to information that should not be accessible, for example, via the contactless interface (such as, for instance, the cardholder name), and such can remain the case throughout the card's lifetime if desired. Additionally, in one or more embodiments of the invention, the read record filters can be customized and set to an issuer's requirements (for example, by a bureau or by the issuer using the EMV specified issuer script commands once the card is in use).

Figure 4:
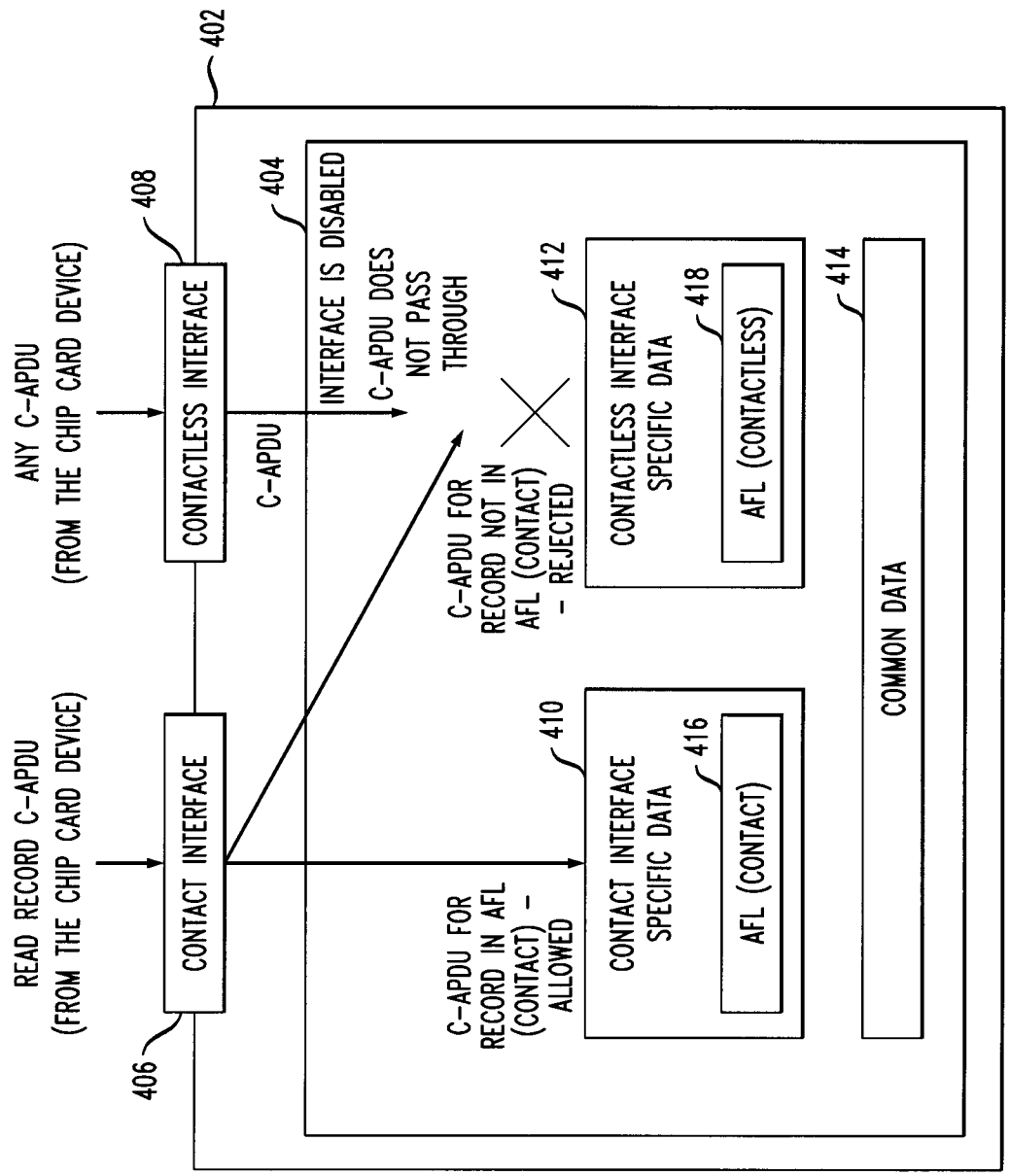
FIG. 4 depicts typical EMV card application behavior with the contactless interface disabled.

FIG. 4 depicts typical EMV card application behavior with the contactless interface disabled. By way of illustration, FIG. 4 depicts an EMV payment device 402, which includes a contact interface 406 (which receives a read record C-APDU from the chip card device) and a contactless interface 408 (which might be sent any C-APDU from the chip card device). Device 402 also includes a payment application 404 (that is, software code), which includes a contact interface specific data component 410 (which itself includes a contact AFL component 416), a contactless interface specific data component 412 (which itself includes a contactless AFL component 418), and a common data component 414. As depicted in FIG. 4, the C-APDU for a record in the contact AFL component is allowed from the contact interface, while the C-APDU for a record not in the contact AFL (for example, a record in the contactless interface specific data component 412) is rejected. Additionally, the C-APDU from the contactless interface does not pass through.

Figure 5:
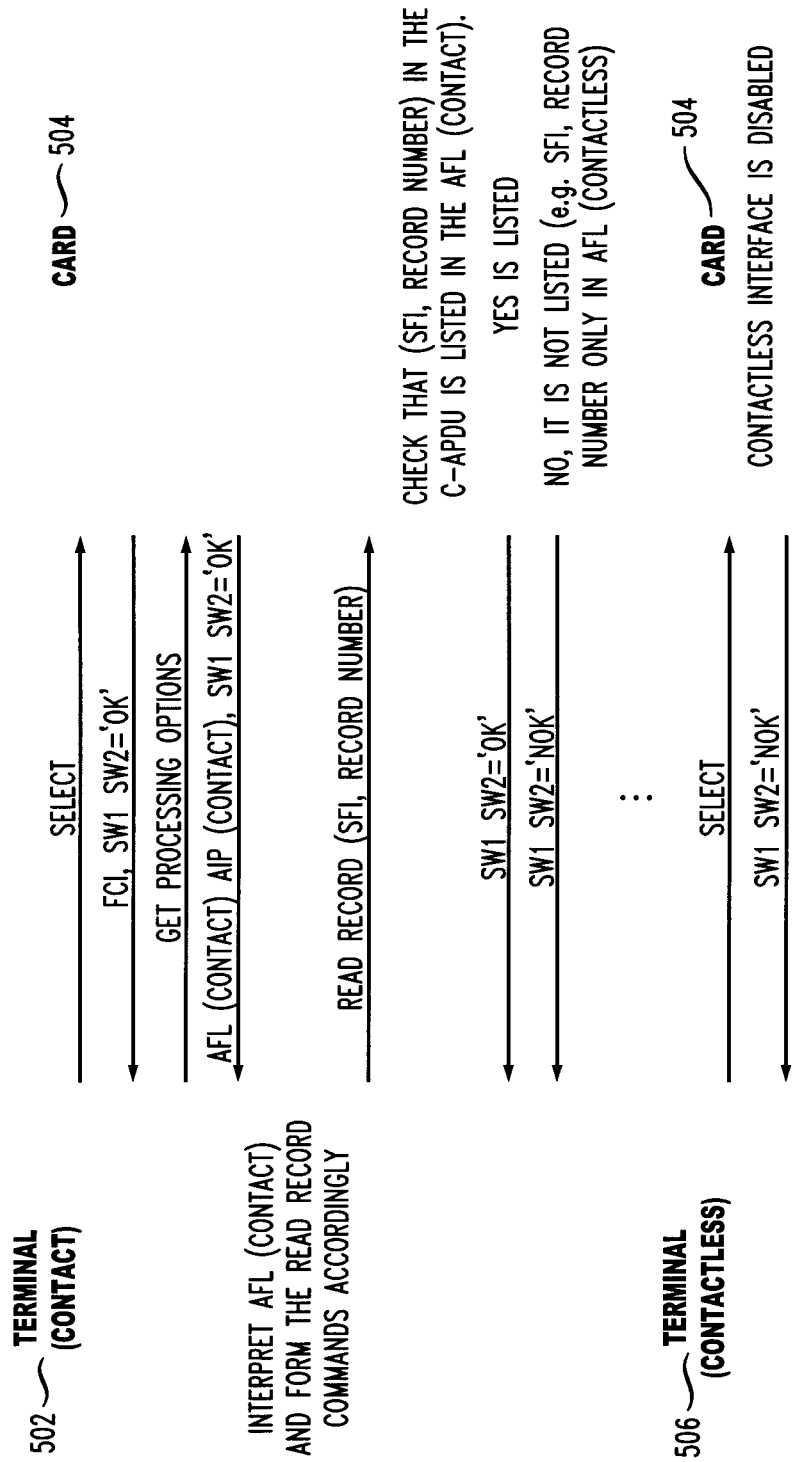
FIG. 5 depicts typical EMV card application behavior with the contactless interface disabled (while the card is in the mail)

FIG. 5 depicts typical EMV card application behavior with the contactless interface disabled (while the card is in the mail). By way of illustration, FIG. 5 depicts communications between a contact terminal 502 and a card 504, as well as between a contactless terminal 506 and the card 504.

The communication steps illustrated in FIG. 5 between the contact terminal 502 and card 504 illustrate the terminal successfully performing the initial steps of a normal EMV payment transaction including exchanging the Select, Get Processing Options, and Read Record commands (C-APDUs) and responses (R-APDUs). FIG. 5 also depicts that if an attempt was made by the terminal to read data that was not intended to be used over the contact interface (that is, not listed in the AFL (contact)), then it would be rejected with an error (SW1SW2='NOK'). Additionally, the communication steps illustrated in FIG. 5 between the contactless terminal 506 and card 504 illustrate the attempt of a similar transaction failing with an error (SW1SW2='NOK') as the card's contactless interface has been disabled.

Figure 6:
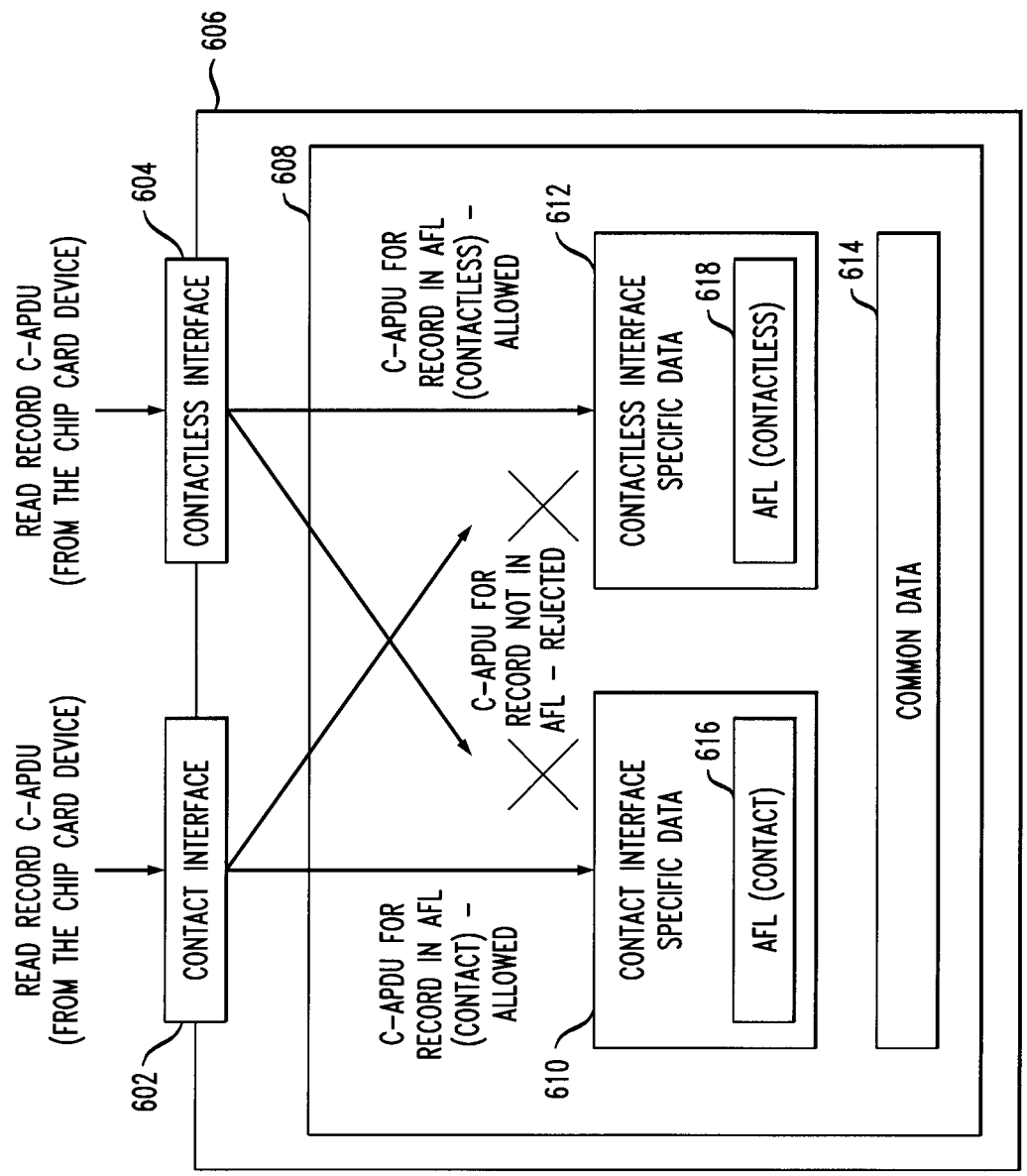
FIG. 6 depicts typical EMV card application behavior with the contactless interface enabled.

FIG. 6 depicts typical EMV card application behavior with the contactless interface enabled. By way of illustration, FIG. 6 depicts an EMV payment device 606, which includes a contact interface 602 (which receives a read record C-APDU from the chip card device) and a contactless interface 604 (which receives a read record C-APDU from the chip card device). Device 606 also includes a payment application 608, which includes a contact interface specific data component 610 (which itself includes a contact AFL component 616), a contactless interface specific data component 612 (which itself includes a contactless AFL component 618), and a common data component 614. As depicted in FIG. 6, the C-APDU for a record in the contact AFL component is allowed from the contact interface, while the C-APDU from the contact interface for a record not in the contact AFL is rejected. Additionally, the C-APDU for a record in the contactless AFL is allowed from the contactless interface, while the C-APDU from the contactless interface for a record not in the contactless AFL is rejected.

Figure 7:
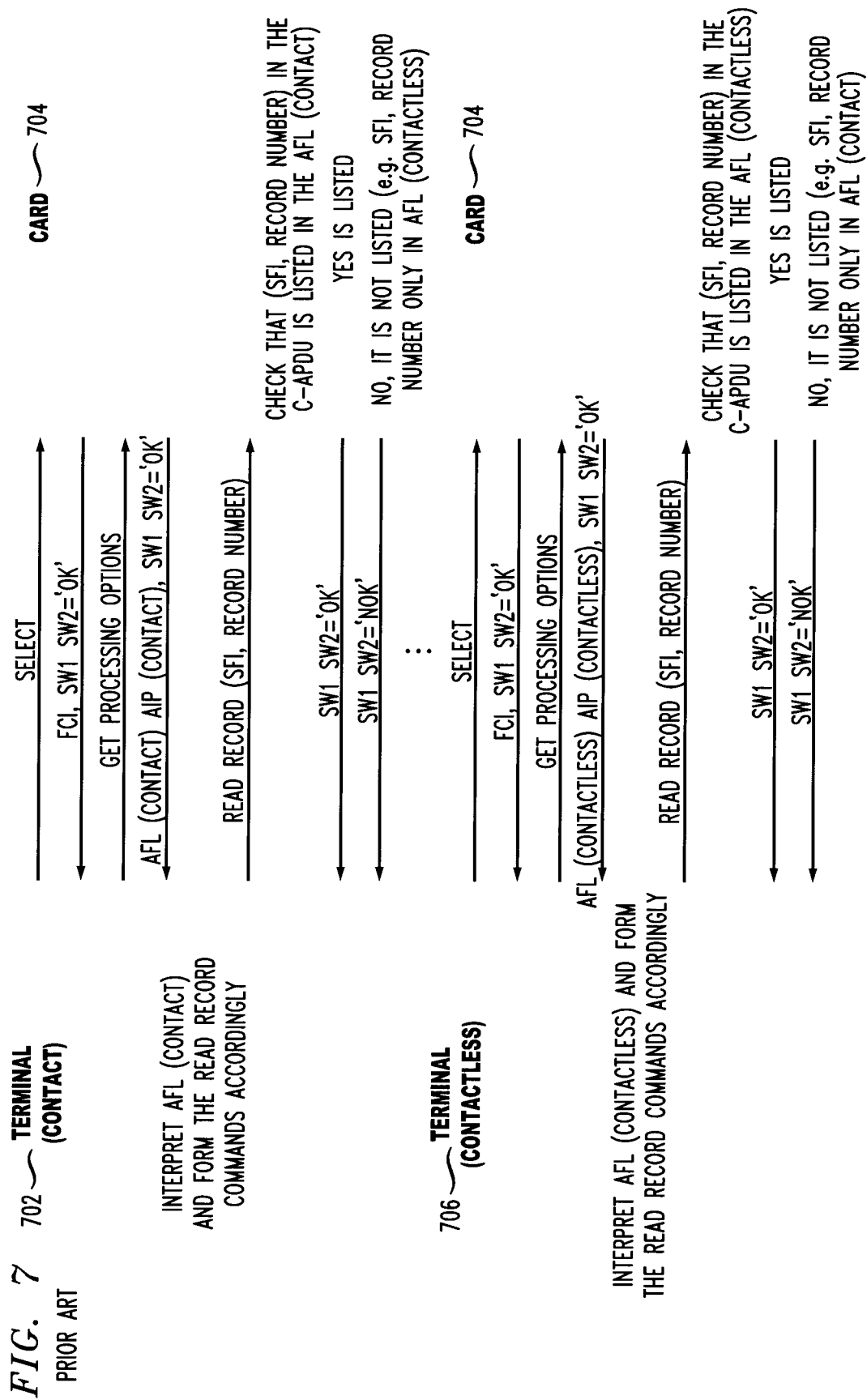
FIG. 7 depicts typical EMV card application behavior with the contactless interface enabled (normal in use scenario)

FIG. 7 depicts typical EMV card application behavior with the contactless interface enabled (normal in use scenario). By way of illustration, FIG. 7 depicts communications between a contact terminal 702 and a card 704, as well as between a contactless terminal 706 and the card 704.

The communication steps illustrated in FIG. 7 between the contact terminal 702 and card 704 illustrate the terminal successfully performing the initial steps of a normal EMV payment transaction including exchanging the Select, Get Processing Options, and Read Record commands (C-APDUs) and responses (R-APDUs). FIG. 7 also illustrates that if an attempt was made by the terminal to read data that was not intended to be used over the contact interface (that is, not listed in the AFL (contact)), then it would be rejected with an error (SW1SW2='NOK'). The communication steps illustrated in FIG. 7 between the contactless terminal 706 and card 704 depict the same behavior but this time with an error occurring (SW1SW2='NOK') if the contactless terminal attempts to read data that was not intended to be used over the contactless interface (that is, not listed in the AFL (contactless)).

Figure 8:
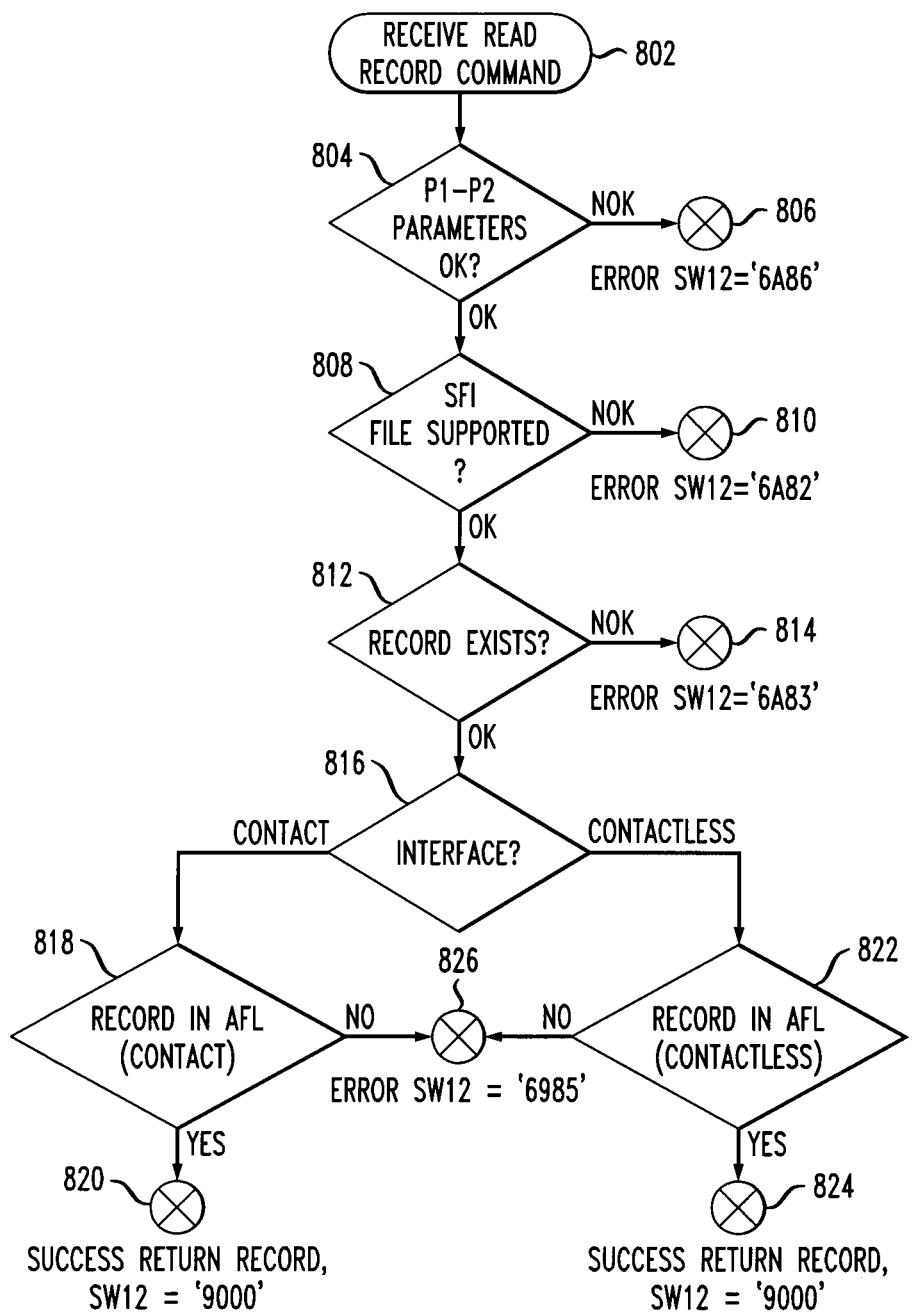
FIG. 8 depicts a flow diagram illustrating typical EMV card application behavior.

FIG. 8 depicts a flow diagram illustrating typical EMV card application behavior. Step 802 includes receiving a read record command. Step 804 includes determining if the P1-P2 parameters, which encode the SFI and record number being requested, are correctly formatted. Specifically, the record number in P1 must not be '00' and the last three bits of the P2 parameter must have the binary value '100', indicating that P1 does include a record number. If no, then an error is generated in step 806. If yes, then one proceeds to step 808 to determine if the file identified by the short file identifier (SFI) specified in the P2 parameter is supported (that is, exists). If no, then an error is generated in step 810. If yes, then one proceeds to step 812 to determine if the record specified by the P1 parameter exists. If no, then an error is generated in step 814. If yes, then one proceeds step 816 to identify the active interface. If the contact interface is in use, then one proceeds to step 818 to determine if the record is in the contact AFL. If no, then an error is generated in step 826. If yes, then the record and an indication of success are returned in step 820. If the contactless interface is in use, then one proceeds to step 822 to determine if the record is in the contactless AFL. If no, then an error is generated in step 826. If yes, then the record and an indication of success are generated in step 824.

Figure 9:
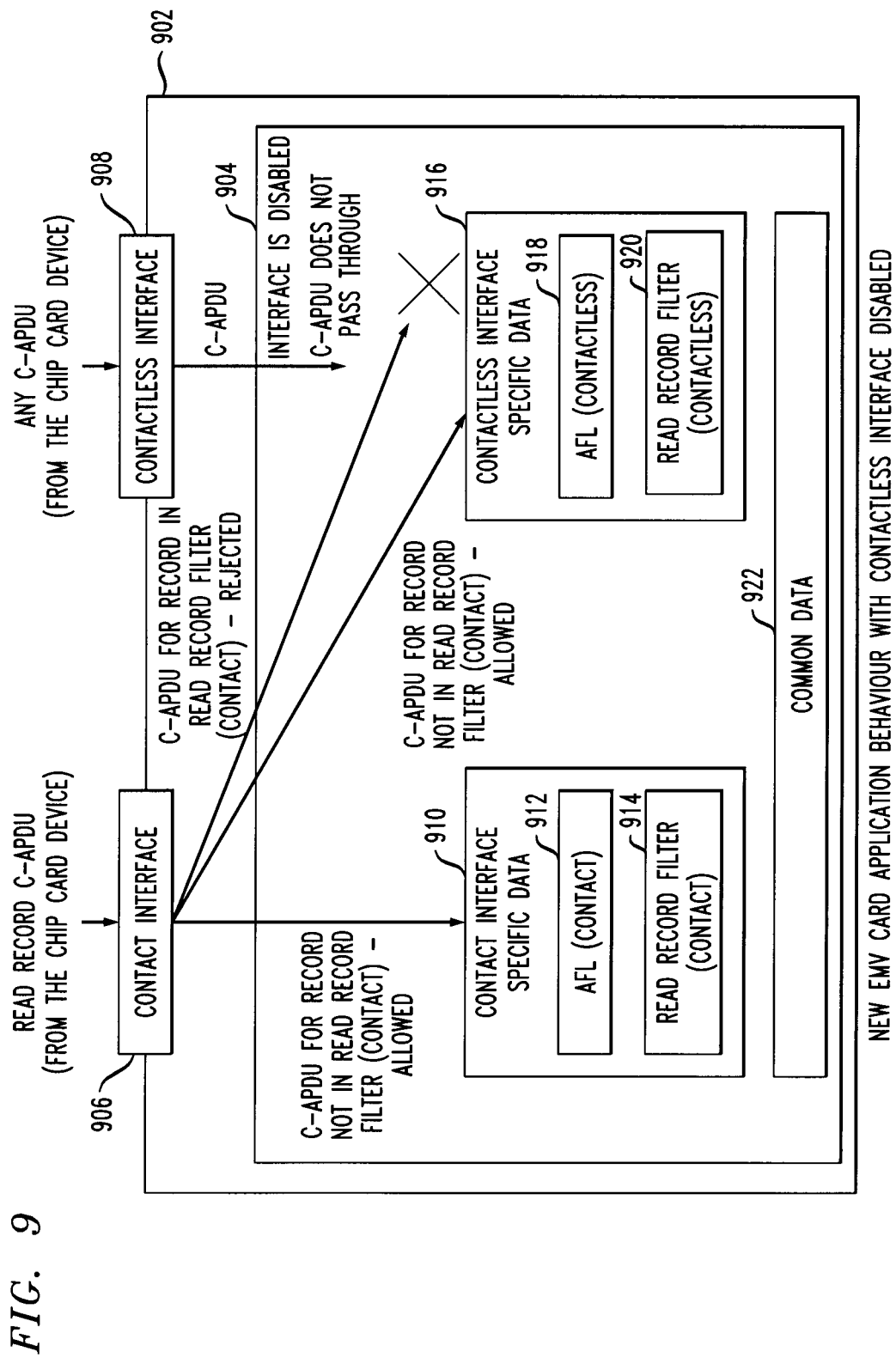
FIG. 9 depicts EMV card application behavior with the contactless interface disabled, according to aspects of the invention.

FIG. 9 depicts EMV card application behavior with the contactless interface disabled, according to aspects of the invention. By way of illustration, FIG. 9 depicts a payment device 902, which includes a contact interface 906 (which receives a read record C-APDU from the chip card device) and a contactless interface 908 (which might be sent any C-APDU from the chip card device). Device 902 also includes a payment application 904, which includes a contact interface specific data component 910 (which itself includes a contact AFL component 912 and a contact read record filter 914), a contactless interface specific data component 916 (which itself includes a contactless AFL component 918 and a contactless read record filter 920), and a common data component 922.

As depicted in FIG. 9, the C-APDU for a contact interface specific record that is not in the contact read record filter is allowed from the contact interface, as is the C-APDU for a contactless interface specific record that is not in the contact read record filter, while the C-APDU for a record in the contactless read record filter is rejected. Additionally, no C-APDU from the contactless interface will pass through (that is, they will be rejected).

Figure 10:
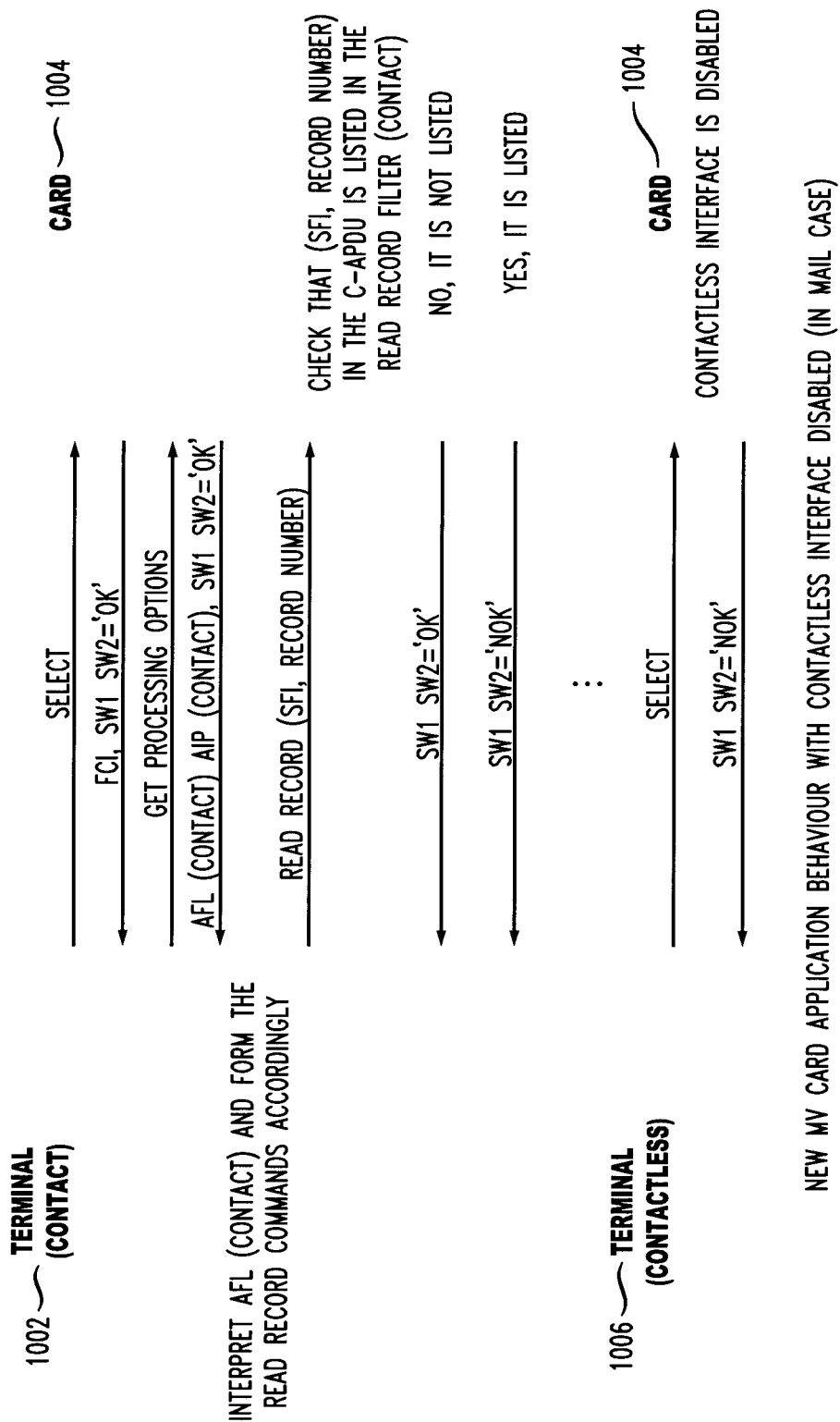
FIG. 10 depicts EMV card application behavior with the contactless interface disabled (while the card is in the mail), according to aspects of the invention.

FIG. 10 depicts EMV card application behavior with the contactless interface disabled (while the card is in the mail), according to aspects of the invention. By way of illustration, FIG. 10 depicts communications between a contact terminal 1002 and a card 1004, as well as between a contactless terminal 1006 and the card 1004.

The communication steps illustrated in FIG. 10 between the contact terminal 1002 and card 1004 illustrate the terminal successfully performing the initial steps of a normal EMV payment transaction including exchanging the Select, Get Processing Options, and Read Record commands (C-APDUs) and responses (R-APDUs). FIG. 10 also depicts that if an attempt was made by the terminal to read data that was specifically not allowed to be used over the contact interface (listed in the Read Record Filter (contact)), then it would be rejected with an error (SW1SW2='NOK'). The communication steps illustrated in FIG. 10 between the contactless terminal 1006 and card 1004 illustrate the attempt of a similar transaction failing with an error (SW1SW2='NOK'), as the card's contactless interface has been disabled.

Figure 11:
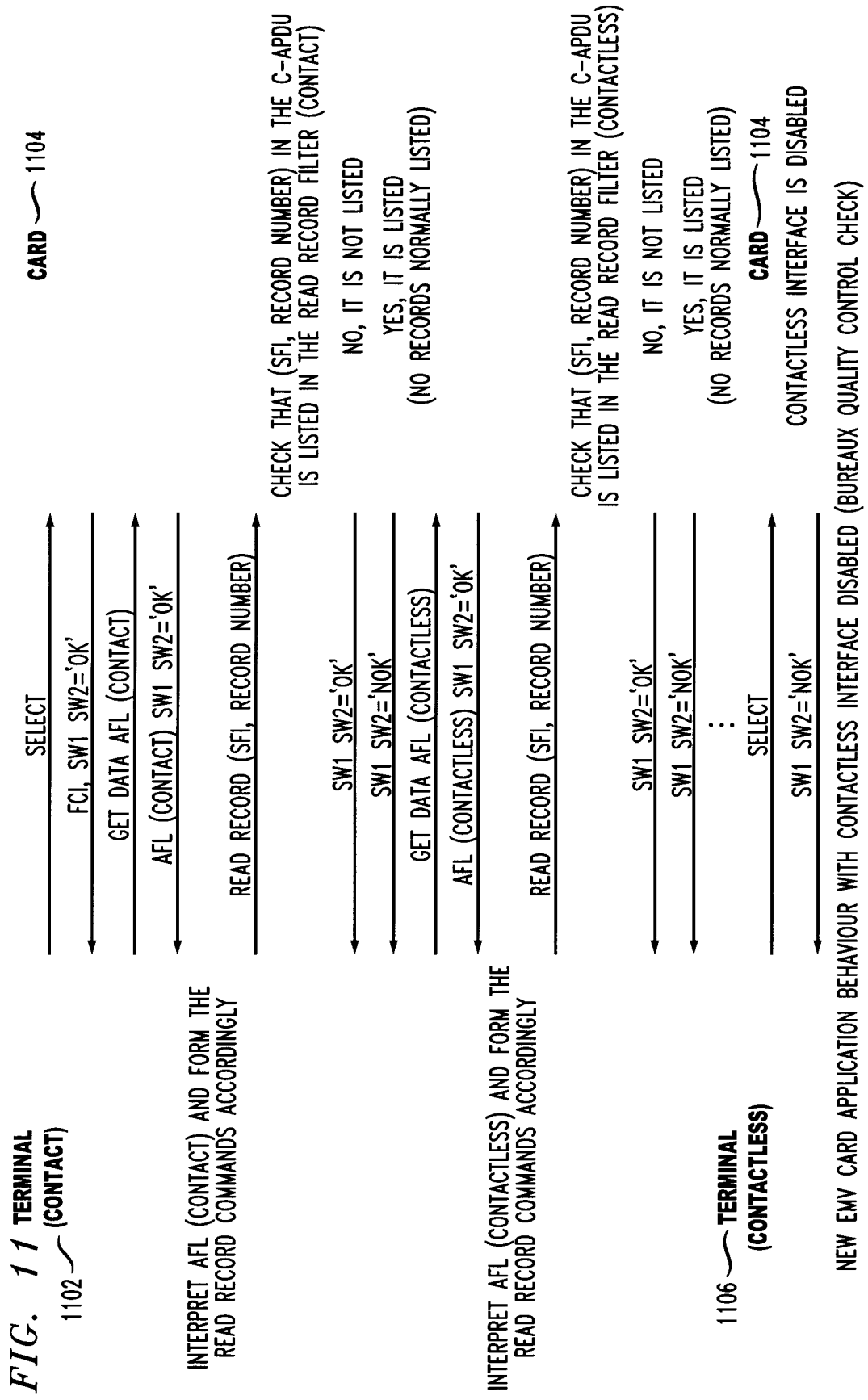
FIG. 11 depicts EMV card application behavior with the contactless interface disabled (bureau quality control check scenario), according to aspects of the invention.

FIG. 11 depicts EMV card application behavior with the contactless interface disabled (bureau quality control check scenario), according to aspects of the invention. By way of illustration, FIG. 11 depicts communications between a contact terminal 1102 and a card 1104, as well as between a contactless terminal 1106 and the card 1104. The communication steps illustrated in FIG. 11 show the contact terminal 1102 selecting the payment application with a Select command, obtaining the AFL identifying the records used during a contact transaction by issuing a Get Data command, reading these records using the Read Record command, then obtaining the AFL identifying the records used during a contactless transaction by issuing a Get Data command and reading these records using the Read Record command. FIG. 11 also depicts that if an attempt was made to read any record included in the Read Record Filter (contact), then it would be rejected with an error (SW1SW2='NOK'), but that no such records would typically be included. Again, commands via the contactless interface are not accepted.

Figure 12:
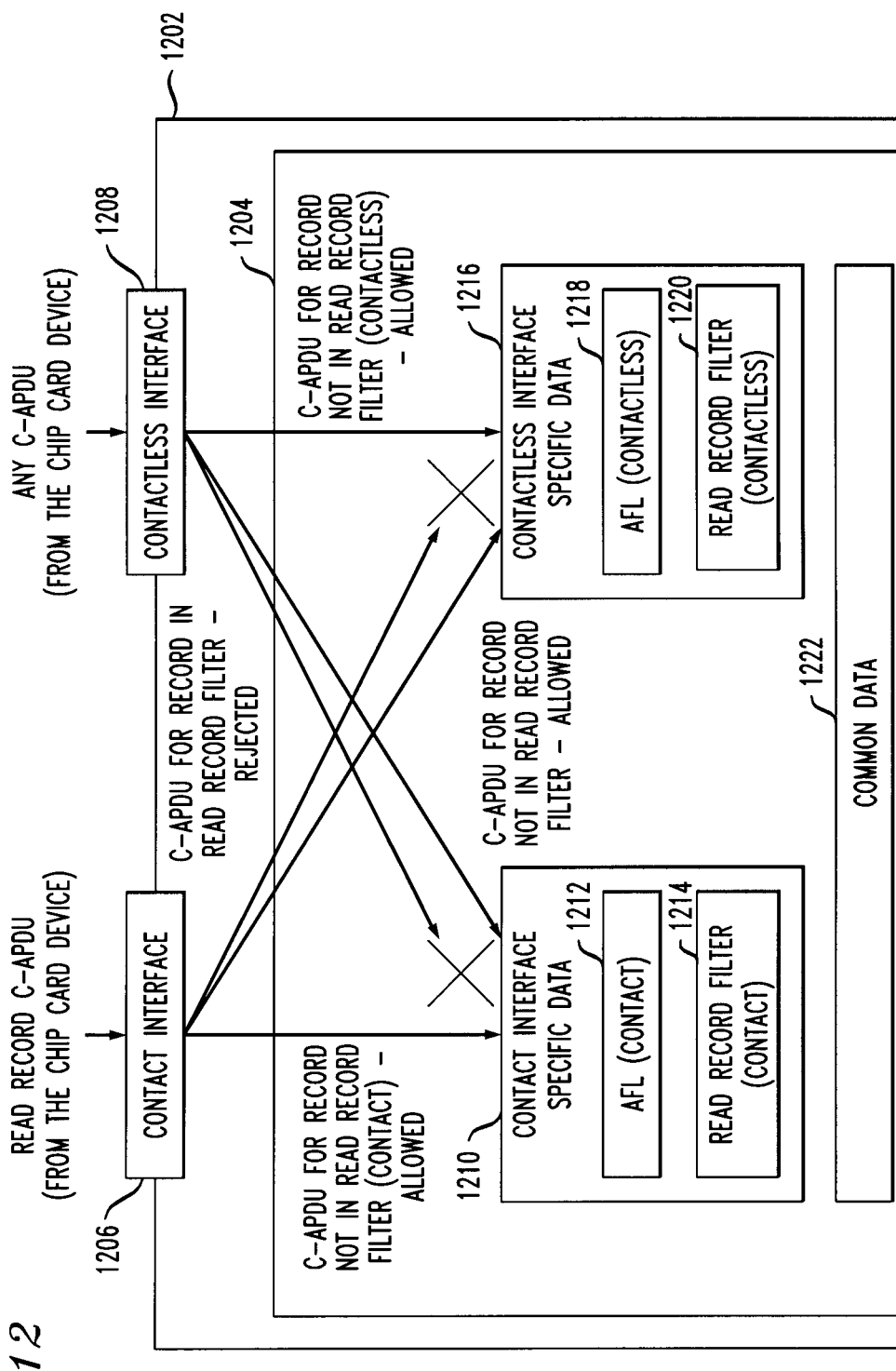
FIG. 12 depicts EMV card application behavior once the contactless interface is enabled, according to aspects of the invention.

FIG. 12 depicts EMV card application behavior once the contactless interface is enabled, according to aspects of the invention. By way of illustration, FIG. 12 depicts a payment device 1202, which includes a contact interface 1206 (which receives a read record C-APDU from the chip card device) and a contactless interface 1208 (which could be sent any C-APDU from the chip card device). Device 1202 also includes a payment application 1204, which includes a contact interface specific data component 1210 (which itself includes a contact AFL component 1212 and a contact read record filter 1214), a contactless interface specific data component 1216 (which itself includes a contactless AFL component 1218 and a contactless read record filter 1220), and a common data component 1222.

As depicted in FIG. 12, the C-APDU for a contact interface specific record that is not in the contact read record filter is allowed from the contact interface, as is the C-APDU for a contactless interface specific record that is not in the contact read record filter, while the C-APDU for any record in the contact read record filter is rejected. Additionally, from the contactless interface, the C-APDU for a contactless interface specific record that is not in the contactless read record filter is allowed, as is the C-APDU for a contact interface specific record not in the contactless read record filter, while the C-APDU for any record in the contactless read record filter is rejected.

Figure 13:
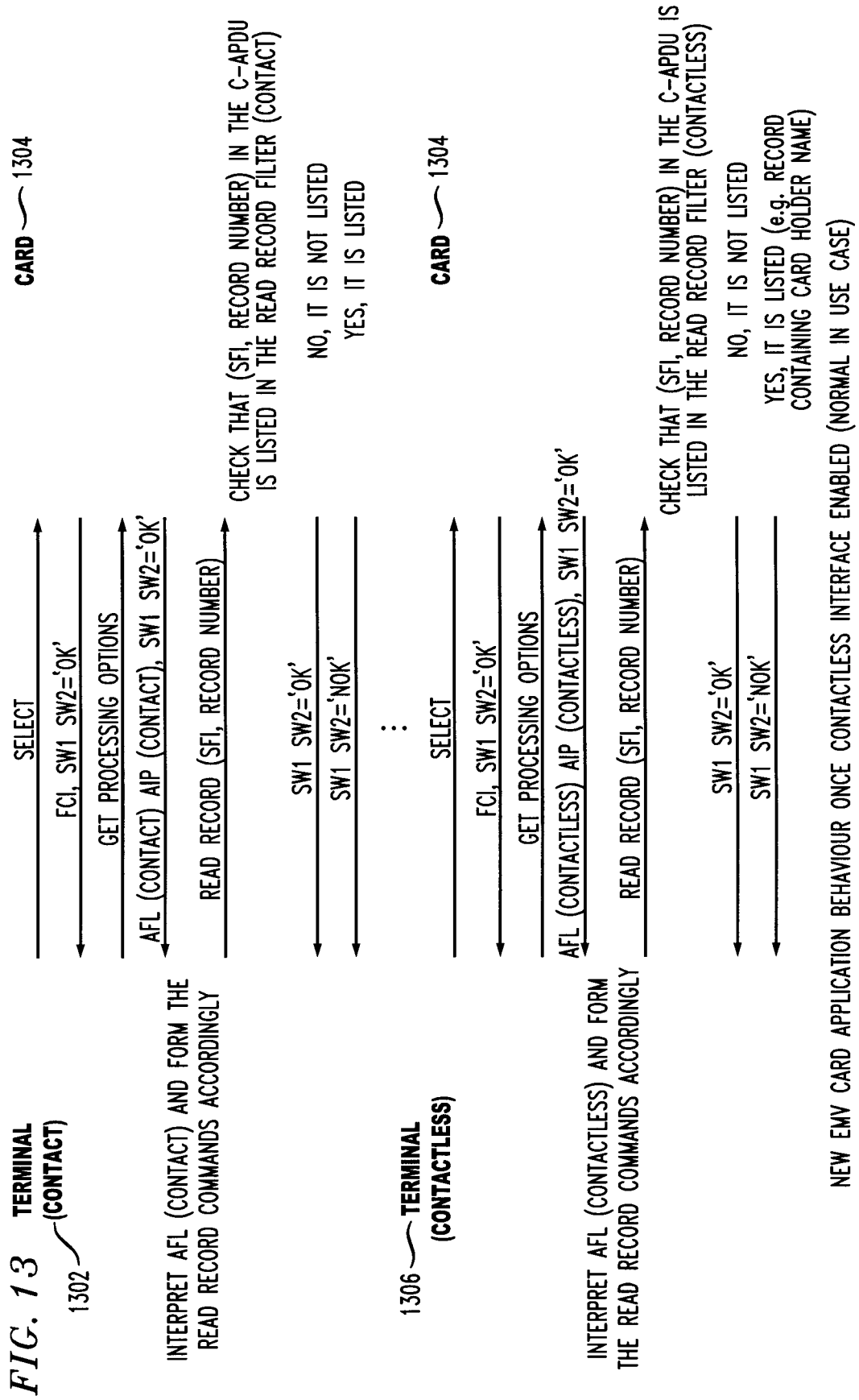
FIG. 13 depicts EMV card application behavior once the contactless interface is enabled (normal in use scenario), according to aspects of the invention.

FIG. 13 depicts EMV card application behavior once the contactless interface is enabled (normal in use scenario), according to aspects of the invention. By way of illustration, FIG. 13 depicts communications between a contact terminal 1302 and a card 1304, as well as between a contactless terminal 1306 and the card 1304.

The communication steps illustrated in FIG. 13 between the contact terminal 1302 and card 1304 illustrate the terminal successfully performing the initial steps of a normal EMV payment transaction including exchanging the Select, Get Processing Options, and Read Record commands (C-APDUs) and responses (R-APDUs). FIG. 13 also shows that if an attempt was made by the terminal to read data that was not allowed to be accessed over the contact interface (listed in the Read Record Filter (contact)), then it would be rejected with an error (SW1SW2='NOK'). The communication steps illustrated in FIG. 13 between the contactless terminal 1306 and card 1304 depict the same behavior, but this time with an error occurring (SW1SW2='NOK') if the contactless terminal attempts to read data that was not allowed to be accessed over the contactless interface (listed in the Read Record Filter (contactless)). As during normal use, when making payment transactions, a terminal will only attempt to read the records listed in the AFL for the interface that is in use. These records would not also be listed in the read record filter for the interface that is in use.

Figure 14:
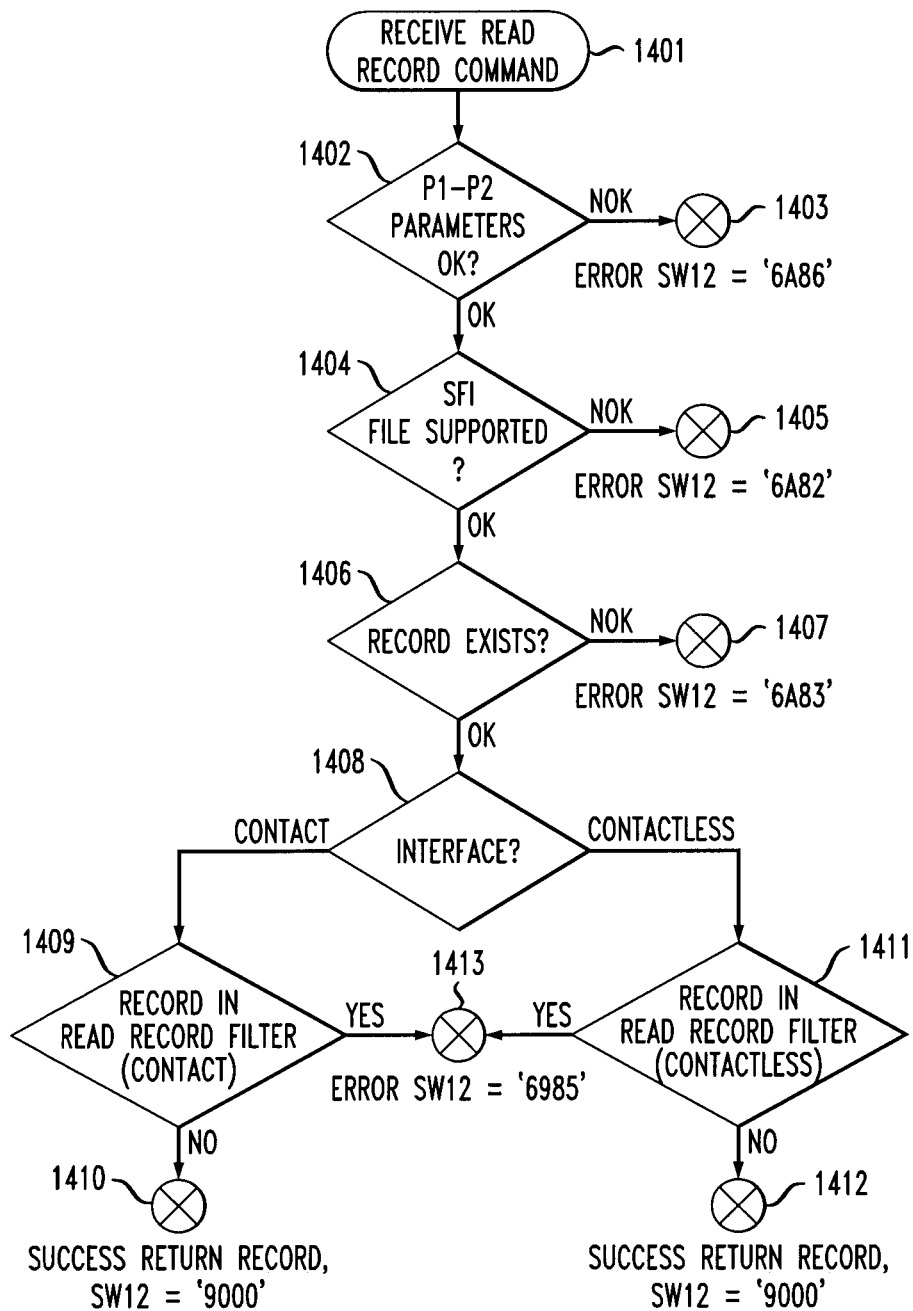
FIG. 14 depicts EMV card application behavior, according to aspects of the invention.

FIG. 14 depicts a flow diagram illustrating EMV card application behavior, according to aspects of the invention. Step 1401 includes receiving a read record command. Step 1402 includes determining if the P1-P2 parameters, which encode the SFI and record number being requested, are correctly formatted. Specifically, the record number in P1 must not be '00' and the last three bits of the P2 parameter must have the binary value '100', indicating that P1 does include a record number. If no, then an error is generated in step 1403. If yes, then one proceeds to step 1404 to determine if the file identified by the short file identifier (SFI) specified in the P2 parameter is supported (that is, exists). If no, then an error is generated in step 1405. If yes, then one proceeds to step 1406 to determine if the record specified by the P1 parameter exists. If no, then an error is generated in step 1407. If yes, then one proceeds step 1408 to identify the active interface. If the contact interface is in use, then one proceeds to step 1409 to determine if the record is in the contact read record filter. If yes, then an error is generated in step 1413. If no, then the record and an indication of success are returned in step 1410. If the contactless interface is in use, then one proceeds to step 1411 to determine if the record is in the contactless read record filter. If yes, then an error is generated in step 1413. If no, then the record and an indication of success are returned in step 1412.

Figure 15:
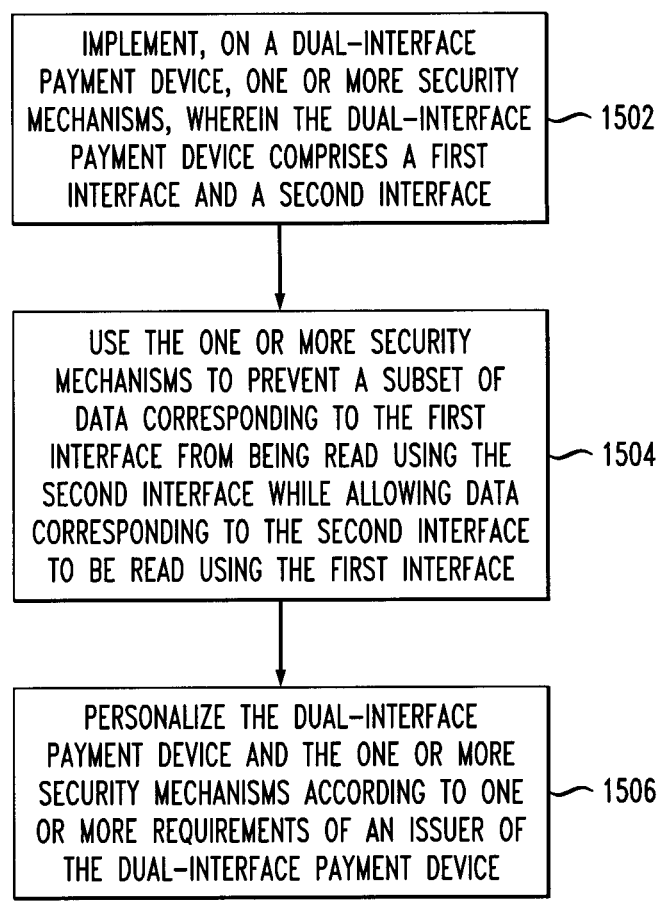
FIG. 15 is a flow diagram illustrating techniques for enabling performance of a quality control function on the contactless interface while the contactless interface is disabled, according to an embodiment of the invention.

FIG. 15 is a flow diagram illustrating techniques for enabling performance of a quality control function on the contactless interface while the contactless interface is disabled, according to an embodiment of the invention. Step 1502 includes implementing, on a dual-interface payment device, one or more security mechanisms, wherein the dual-interface payment device comprises a first interface and a second interface. The security mechanisms can include, for example, one or more read record filters. Also, by way of example, the first interface can include a contact interface and the second interface can include a contactless interface.

Read record filters can be coded as a combination of zero or more short file identifiers (SFIs) and zero or more record numbers. Also, the combination of SFIs and record numbers specify records (zero or more) that cannot be read through a read record command. Further, in one or more embodiments of the invention, a separate security mechanism (for example, read record filter) is used for each interface.

Additionally, each read record filter provides a set of instructions to the dual-interface payment device that identifies to the dual-interface payment device specific data that cannot be read when using a particular interface. By way of example, when using a contactless interface, one cannot read what the cardholder's name is that is personalized onto the card for use when they are performing a contact transaction. Also, in one or more embodiments of the invention, a security mechanism (for instance, a read record filter) for a first (for example, contact) interface can be personalized to a value required by an issuer as well as formatted to allow reading of, through the first (for example, contact) interface, all data corresponding to the first interface as well as all data corresponding to the second (for example, contactless) interface.

Further, a read record filter for a second (for example, contactless) interface can contain one or more short file identifiers and one or more record numbers identifying records which contain data restricted to the first interface (such as, for example, cardholder name, loyalty identifier, primary account number, track discretionary data, etc.). By including this data element in the read record filter, it (that is, for example, the cardholder name data) cannot be read over the contactless interface. In one or more embodiments of the invention, a security mechanism (for example, a read record filter) can remain in effect on the dual-interface payment device in perpetuity, and/or can also be modified while the dual-interface payment device is in use (for example, disabled, updated, etc.).

Step 1504 includes using the one or more security mechanisms to prevent a subset of data (for example, a portion thereof, the entirety thereof, etc.) corresponding to the first interface from being read using the second interface while allowing data corresponding to the second interface to be read using the first interface. Using the one or more security mechanisms to prevent a subset of data corresponding to the first interface from being read using the second interface while allowing data corresponding to the second interface to be read using the first interface can include providing (for example, via the payment application) a command to the first interface to enable reading of application file locators from both the first and second interface Also, using the security mechanisms to prevent a subset of data corresponding to the first interface from being read using the second interface while allowing data corresponding to the second interface to be read using the first interface can include providing a read record command to the first interface to enable reading of all of files and records that are not listed in a read record filter. As such, one or more embodiments of the invention include enabling the first interface to read all records included in an application file locator for the first interface and an application file locator for the second interface when an instance of a read record filter corresponding to the first interface is empty.

Additionally, using the security mechanisms to prevent a subset of data corresponding to the first interface from being read using the second interface, while allowing data corresponding to the second interface to be read using the first interface, can include preventing reading of all of files and records that are listed in a read record filter.

Step 1506 includes personalizing the dual-interface payment device and the one or more security mechanisms according to one or more requirements of an issuer of the dual-interface payment device. Personalizing the dual-interface payment device and the security mechanisms according to one or more requirements of an issuer of the dual-interface payment device can be performed, for example, by a personalization bureau (or similar agent).

The techniques depicted in FIG. 15 can also include performing a quality control function on the second interface, via the first interface, to verify that data corresponding to the second interface is correct (for example, while the second interface is disabled).

In another aspect, one or more processors of a payment device as described above carry out or otherwise facilitate any one, some or all of the method steps described above.

FIG. 16 is a diagram illustrating plurality of issuers 1602 connected to a plurality of card production centers 1604 (for example, bureaus) sending cards via the mail 1606 to a plurality of cardholder homes 1608. By way of illustration, FIG. 16 depicts, as detailed herein, one or more embodiments of the invention that can include enabling the specification, on an interface basis, of certain data on a card as not accessible. As depicted in FIG. 16, a card can be configured (to comply with issuer requirements) such that it can be personalized at a card production center or bureau with a set of data for each interface, with the contactless interface disabled temporarily while it is shipped in the mail to a cardholder home, while still enabling a bureau, using the contact interface, to read all of the data for quality control purposes.

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126, a reader 132, a host, server, and/or processing center 140, 142, 144 (optionally with data warehouse 154) of a merchant, issuer, acquirer, processor, or operator of a network 2008 operating according to a payment system standard (and/or specification), and the like. Firmware might be employed, for example, in connection with payment devices such as cards 102, 112, 1302 and mobile telephone 1420.

Figure 17:
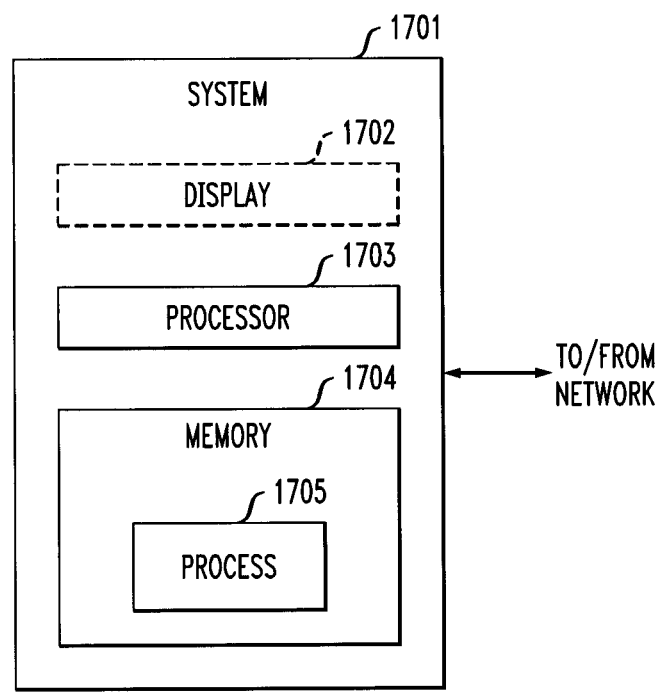
FIG. 17 is a block diagram of an exemplary computer system useful in one or more embodiments of the invention.

FIG. 17 is a block diagram of a system 1701 that can implement part or all of one or more aspects or processes of the invention. As shown in FIG. 17, memory 1704 configures the processor 1703 (which could correspond, for example, to processor portions 106, 116, 130, 1306, 1460; a processor of a reader 132; processors of remote hosts in centers 140, 142, 144; processors of hosts and/or servers implementing various functionality, and the like) to implement one or more aspects of the methods, steps, and functions disclosed herein (collectively, shown as process 1705 in FIG. 17). Different method steps can be performed by different processors. The memory 1704 could be distributed or local and the processor 1703 could be distributed or singular. The memory 1704 could be implemented as an electrical, magnetic or optical memory, or any combination of these or other types of storage devices (including memory portions as described above with respect to cards 102, 112, 1302). It should be noted that if distributed processors are employed, each distributed processor that makes up processor 1703 generally contains its own addressable memory space. It should also be noted that some or all of computer system 1701 can be incorporated into an application-specific or general-use integrated circuit. For example, one or more method steps could be implemented in hardware in an ASIC rather than using firmware. Display 1702 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (for example, floppy disks, hard drives, compact disks, EEPROMs, or memory cards) or may be a transmission medium (for example, a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 122, 124, 126, 140, 142, 144, 130, 132, 2004, 2006, 2008, 2010, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 122, 124, 126, 140, 142, 144, 130, 132, 2004, 2006, 2008, 2010, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 1701 as shown in FIG. 17) running a server program. It will be understood that such a physical server may or may not include a display, keyboard, or other input/output components. A "host" includes a physical data processing system (for example, system 1701 as shown in FIG. 17) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include a payment application module with a contact interface and a contactless interface that can incorporate, by way of example and not limitation, contact interface specific data, a contact AFL, a contact read record filter, contactless interface specific data, a contactless AFL, a contactless read record filter and common data. The module(s) can run, for example on one or more hardware processors.

The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 2008, another virtual private network (VPN), the Internet, a local area and/or wide area network (LAN (for example, LAN 663) and/or WAN), via an EDI layer, and so on. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A payment device comprising:
a payment device memory;
a contactless interface including an antenna;
a contact interface including a plurality of electrical contacts;
at least one payment device processor coupled to the payment device memory, the contactless interface, and the contact interface; and
a body portion mounting the memory, the contact interface, the contactless interface, and the at least one payment device processor, the body portion having a card form factor;
wherein the at least one payment device processor is operative to:
implement one or more security mechanisms to the contact and contactless interfaces of the payment device, wherein the contactless interface and the contacted interface are further configured to provide access to the payment device memory;
disable the contactless interface prior to mailing of the device;
facilitate performance of a quality control function on the contactless data while the contactless interface is disabled by:
receiving a read record command at the contact interface; and
providing, via the contact interface, to a quality control bureau, at least one record of the contactless data listed in the read record command, based on a read record filter corresponding to the contact interface, wherein the read record filter is executed to implement the one or more security mechanisms on the contact and contactless interfaces by allowing the read record command to read records in accordance with the read record filter;
while the contactless interface is disabled, after the device is received by an end user subsequent to the mailing of the device, conduct a transaction with the contact interface; and
responsive to conducting the transaction with the contact interface while the contactless interface is disabled, enabling the contactless interface.

2. The payment device of claim 1, wherein the at least one payment device processor personalizes the payment device and the one or more security mechanisms according to one or more requirements of an issuer of the payment device.

3. The payment device of claim 1, wherein each of the one or more read record filters is coded as a combination of zero or more short file identifiers and zero or more record numbers.

4. The payment device of claim 1, wherein a separate security mechanism is implemented onto each interface.

5. The payment device of claim 1, wherein each of the one or more security mechanisms provides a set of instructions to the payment device that identifies to the payment device specific data that cannot be read when using a particular interface.

6. The payment device of claim 1, wherein at least one of the security mechanisms, for the contactless interface, among the one or more security mechanisms, contains one or more short file identifiers and one or more record numbers identifying one or more records which contain data restricted to the contact interface.

7. The payment device of claim 1, wherein the at least one payment device processor prevents a reading of all of files and records that are listed in at least one of the one or more read record filters.

8. The payment device of claim 6, wherein the restricted data includes cardholder name.

* * * * *